United States Patent

Harper et al.

[11] Patent Number: 5,956,645
[45] Date of Patent: Sep. 21, 1999

[54] MOBILITY MESSAGING USING UNNUMBERED INFORMATION FRAMES

[75] Inventors: Donald Harper, Palm Bay; Sheausong Yang, Melbourne, both of Fla.

[73] Assignee: Airnet Communicatoins Corp., Melbourne, Fla.

[21] Appl. No.: 08/670,372

[22] Filed: Jun. 25, 1996

[51] Int. Cl.[6] .................................................. H04Q 7/22
[52] U.S. Cl. ........................................ 455/466; 455/436
[58] Field of Search .................................... 455/422, 436, 455/437, 466

[56] References Cited

U.S. PATENT DOCUMENTS

| | | | |
|---|---|---|---|
| 4,985,891 | 1/1991 | Fujiwara et al. | 370/538 |
| 5,521,963 | 5/1996 | Shrader et al. | 455/422 |
| 5,533,019 | 7/1996 | Jayapalan | 455/466 |
| 5,598,412 | 1/1997 | Griffith et al. | 455/466 |
| 5,608,780 | 3/1997 | Gerszberg et al. | 455/436 |

*Primary Examiner*—Dwayne D. Bost
*Assistant Examiner*—Myron K. Wyche
*Attorney, Agent, or Firm*—Farkas & Manelli, PLLC; Rusell O. Paige

[57] ABSTRACT

A technique for mobility signaling between a Base Transceiver System (BTS) and Mobile Switching Center (MSC) in a mobile telecommunications system. The MSC is interconnected to a number of BTSs using one or more primary rate links using a protocol such as Integrated Digital Services Network (ISDN), including a number of bearer (B) channels for voice transmission and at least one data (D) channel for control function transmission. Standard call processing messages are utilized on the ISDN D channel to support basic telephone functions such as call origination, call termination, and call release as much as possible. However, an additional logical communication link is established over each ISDN D channel to accommodate mobility related messaging which may include messages such as hand-off and registration messaging needed to support mobile communications. The logical communication links are implemented in an unbalanced mode such as provided by the unnumbered information (UI) feature of ISDN and utilizing a Service Access Point Indicator (SAPI) address different from that address used for the standard call processing functions. As a result, the link used for the UI frames having mobility messaging does not need to use call reference values and may be routed over any available virtual communication link. Mobility messaging may thus be transmitted with minimal overhead and is not restricted to either the physical ISDN link which is handling the standard call processing for a call or even the ISDN link which handled previous mobility messages for the same call.

14 Claims, 11 Drawing Sheets

| INFORMATION ELEMENT | VALUE | LENGTH | |
|---|---|---|---|
| PROTOCOL DISCRIMINATOR | | 1 | |
| MESSAGE TYPE | 0x01 | 1 | HANDOFF REQUEST |
| MESSAGE LENGTH | 0x0a | 1 | |
| CORRELATION IDENTIFIER | | | |
|     BTS IDENTIFIER | | 2 | SERVING BTS IDENTIFIER |
|     LINK IDENTIFIER | | 1 | UNIQUE ISDN PRI IDENTIFIER BETWEEN MSC AND BTS |

MEASUREMENT DATA
    SERVING BTS CHANNEL NUMBER
    SERVING BTS SAT FREQUENCY
    SERVING BTS MOBILE POWER LEVEL
    SERVING BTS MEASURED SIGNAL STRENGTH
    MOBIL STATION CLASS MARK

| | BIT 8 | BIT 7 | BIT 6 | BIT 5 | BIT 4 | BIT 3 | BIT 2 | BIT 1 |
|---|---|---|---|---|---|---|---|---|
| 1 | PROTOCOL DISCRIMINATOR ||||||||
| 2 | MESSAGE TYPE = 0x01 ||||||||
| 3 | MESSAGE LENGTH = 0x0a ||||||||
| 4 | SERVING BITS IDENTIFIER ||||||||
| 5 | SERVING BTS IDENTIFIER ||||||||
| 6 | LINK IDENTIFIER ||||||||

| | BIT 8 | BIT 7 | BIT 6 | BIT 5 | BIT 4 | BIT 3 | BIT 2 | BIT 1 |
|---|---|---|---|---|---|---|---|---|
| 7 | CHANNEL NUMBER ||||||||
| 8 | POWER LEVEL ||| 0 | 0 | CHANNEL NUMBER |||
| 9 | STATION CLASS MARK ||| 0 | 0 | SAT |||
| 10 | SERVING BTS MEASURED SIGNAL STRENGTH ||||||||

FIG. 7

| INFORMATION ELEMENT | VALUE | LENGTH | |
|---|---|---|---|
| PROTOCOL DISCRIMINATOR | | 1 | |
| MESSAGE TYPE | 0x02 | 1 | HO MEASUREMENT REQUEST |
| MESSAGE LENGTH | 0x05 | 1 | |
| MEASUREMENT REQUEST IDENTIFIER | | 1 | UNIQUE ID ASSIGNED BY MSC |
| MEASUREMENT DATA | | | |
|     SERVING BTS CHANNEL NUMBER | | | |
|     SERVING BTS SAT FREQUENCY | | | |
|     SERVING BTS MOBILE POWER LEVEL | | | |
|     SERVING BTS MEASURED SIGNAL STRENGTH | | | |
|     MOBIL STATION CLASS MARK | | | |

| | BIT 8 | BIT 7 | BIT 6 | BIT 5 | BIT 4 | BIT 3 | BIT 2 | BIT 1 |
|---|---|---|---|---|---|---|---|---|
| 1 | PROTOCOL DISCRIMINATOR ||||||||
| 2 | MESSAGE TYPE = 0x02 ||||||||
| 3 | MESSAGE LENGTH = 0x05 ||||||||
| 4 | MEASUREMENT REQUEST ID ||||||||
| 5 | CHANNEL NUMBER ||||||||
| 6 | POWER LEVEL ||| 0 | 0 | CHANNEL NUMBER |||
| 7 | STATION CLASS MARK |||| 0 | 0 | SAT ||
| 8 | SERVING BTS MEASURED SIGNAL STRENGTH ||||||||

FIG. 8

| INFORMATION ELEMENT | VALUE | LENGTH | |
|---|---|---|---|
| PROTOCOL DISCRIMINATOR | | 1 | |
| MESSAGE TYPE | 0x03 | 1 | HO MEASUREMENT RESPONSE |
| MESSAGE LENGTH | 0x02 | 1 | |
| MEASUREMENT REQUEST IDENTIFIER | | 1 | COPIED FROM HO-MEASUREMENT-REQUEST MESSAGE |
| MEASUREMENT DATA | | | |
|     CURRENT BTS MEASURED SIGNAL STRENGTH | | | |

| | BIT 8 | BIT 7 | BIT 6 | BIT 5 | BIT 4 | BIT 3 | BIT 2 | BIT 1 |
|---|---|---|---|---|---|---|---|---|
| 1 | PROTOCOL DISCRIMINATOR ||||||||
| 2 | MESSAGE TYPE = 0x03 ||||||||
| 3 | MESSAGE LENGTH = 0x02 ||||||||
| 4 | MEASUREMENT REQUEST ID ||||||||
| 5 | CURRENT BTS MEASURED SIGNAL STRENGTH ||||||||

FIG. 9

| INFORMATION ELEMENT | VALUE | LENGTH | |
|---|---|---|---|
| PROTOCOL DISCRIMINATOR | | 1 | |
| MESSAGE TYPE | 0x04 | 1 | HANDOFF SETUP CONFIRM |
| MESSAGE LENGTH | 0x09 | 1 | |
| CORRELATION IDENTIFIER | | | |
|     BTS IDENTIFIER | | 2 | TARGET BTS IDENTIFIER |
|     LINK IDENTIFIER | | 1 | UNIQUE ISDN PRI IDENTIFIER BETWEEN MSC AND BTS |
|     CALL REFERENCE VALUE | | 3 | CRV WITHIN THE GIVEN LINK |
| MEASUREMENT DATA | | | |
|     TARGET BTS CHANNEL NUMBER | | | |
|     TARGET BTS SAT FREQUENCY | | | |
|     TARGET BTS MOBILE POWER LEVEL | | | |

| | BIT 8 | BIT 7 | BIT 6 | BIT 5 | BIT 4 | BIT 3 | BIT 2 | BIT 1 |
|---|---|---|---|---|---|---|---|---|
| 1 | PROTOCOL DISCRIMINATOR ||||||||
| 2 | MESSAGE TYPE = 0x04 ||||||||
| 3 | MESSAGE LENGTH = 0x09 ||||||||
| 4 | TARGET BTS IDENTIFIER ||||||||
| 5 | TARGET BTS IDENTIFIER ||||||||
| 6 | LINK IDENTIFIER ||||||||

| | BIT 8 | BIT 7 | BIT 6 | BIT 5 | BIT 4 | BIT 3 | BIT 2 | BIT 1 |
|---|---|---|---|---|---|---|---|---|
| 7 | CHANNEL NUMBER ||||||||
| 8 | POWER LEVEL ||| 0 | 0 | CHANNEL NUMBER |||
| 9 | 0 | 0 | 0 | 0 | 0 | 0 | SAT ||

FIG. 10

| INFORMATION ELEMENT | VALUE | LENGTH | |
|---|---|---|---|
| PROTOCOL DISCRIMINATOR | | 1 | |
| MESSAGE TYPE | 0x05 | 1 | HANDOFF DIRECTIVE |
| MESSAGE LENGTH | 0x09 | 1 | |
| CORRELATION IDENTIFIER | | | |
|     BTS IDENTIFIER | | 2 | SERVING BTS IDENTIFIER |
|     LINK IDENTIFIER | | 1 | UNIQUE ISDN PRI IDENTIFIER BETWEEN MSC AND BTS |
|     CALL REFERENCE VALUE | | 3 | CRV WITHIN THE GIVEN LINK |
| MEASUREMENT DATA | | -- COPIED FROM HANDOFF SETUP CONFIRM MESSAGE | |
|     TARGET BTS CHANNEL NUMBER | | | |
|     TARGET BTS SAT FREQUENCY | | | |
|     TARGET BTS MOBILE POWER LEVEL | | | |

| | BIT 8 | BIT 7 | BIT 6 | BIT 5 | BIT 4 | BIT 3 | BIT 2 | BIT 1 |
|---|---|---|---|---|---|---|---|---|
| 1 | PROTOCOL DISCRIMINATOR ||||||||
| 2 | MESSAGE TYPE = 0x05 ||||||||
| 3 | MESSAGE LENGTH = 0x09 ||||||||
| 4 | SERVING BTS IDENTIFIER ||||||||
| 5 | SERVING BTS IDENTIFIER ||||||||
| 6 | LINK IDENTIFIER ||||||||

| | BIT 8 | BIT 7 | BIT 6 | BIT 5 | BIT 4 | BIT 3 | BIT 2 | BIT 1 |
|---|---|---|---|---|---|---|---|---|
| 7 | CHANNEL NUMBER ||||||||
| 8 | POWER LEVEL ||| 0 | 0 | CHANNEL NUMBER |||
| 9 | 0 | 0 | 0 | 0 | 0 | 0 | SAT ||

FIG. 11

| INFORMATION ELEMENT | VALUE | LENGTH | |
|---|---|---|---|
| PROTOCOL DISCRIMINATOR | | 1 | |
| MESSAGE TYPE | 0x06 | 1 | HANDOFF COMPLETE |
| MESSAGE LENGTH | 0x07 | 1 | |
| CORRELATION IDENTIFIER | | | |
|     BTS IDENTIFIER | | 2 | SERVING BTS IDENTIFIER |
|     LINK IDENTIFIER | | 1 | UNIQUE ISDN PRI IDENTIFIER BETWEEN MSC AND BTS |
|     CALL REFERENCE VALUE | | 3 | CRV WITHIN THE GIVEN LINK |
| PASS/FAIL | | 1 BIT | PASS/FAIL INDICATOR |

|   | BIT 8 | BIT 7 | BIT 6 | BIT 5 | BIT 4 | BIT 3 | BIT 2 | BIT 1 |
|---|---|---|---|---|---|---|---|---|
| 1 | PROTOCOL DISCRIMINATOR ||||||||
| 2 | MESSAGE TYPE = 0x06 ||||||||
| 3 | MESSAGE LENGTH = 0x07 ||||||||
| 4 | SERVING BTS IDENTIFIER ||||||||
| 5 | SERVING BTS IDENTIFIER ||||||||
| 6 | LINK IDENTIFIER ||||||||
| 7 | 0 | 0 | 0 | 0 | 0 | 0 | 0 | P/F |

FIG. 12

MOBILITY MESSAGING USING UNNUMBERED INFORMATION FRAMES

FIELD OF THE INVENTION

This invention relates generally to mobile communications systems and more particularly to a technique for using a primary rate signaling interface to support mobility messaging between a base transceiver system (BTS) and mobile switching center (MSC).

BACKGROUND OF THE INVENTION

A mobile telecommunications system such as a cellular mobile telephone (CMT) or personal communication services (PCS) system, a geographic service area is divided into regions, or unit "cells". Each cell is equipped with a central radio transceiver, known as a base transceiver system (BTS) that employs a predetermined set of radio frequencies. The same radio frequencies are then repeated several times across the service area as long as the cells using them are not neighbors. As a radio telephone, or mobile station (MS), moves through this pattern of cells, telephone calls—made from the user's perspective in much the same manner as on regular telephones—are switched from one cell to the next by a computerized system known as a mobile switching center (MSC), sometimes also known as a base station controller (BSC).

In the typical system architecture a mobile switching center manages the connections to a public switched telephone network (PSTN) for a number of BTSs. The BTSs are responsible for generating the appropriately modulated and encoded radio signals to remain in radio contact with the mobile stations located within the respective cell. Each BTS is also required to maintain a landline connection with is associated MSC using using one or more suitable landline interfaces. The interfaces must not only carry the voice signals between the BTS and BSC, but must also support control messaging between the BTS and MSC.

Control messaging includes both the messaging which is needed in any telephone switching system to originate and terminate telephone calls, known as call processing, as well as the messaging needed to permit a call to remain in progress as the mobile station moves from cell to cell, known as mobility messaging, during which time the control of the call is "handed off" from one BTS to another.

One increasingly popular way to interconnect the MSC and BTSs is by the use of standardized transport signaling such as integrated services digital network (ISDN) signaling. A common type of ISDN link provides 24 channels on a single physical carrier medium, with the channels allocated as "23B+D", meaning that 23 of the channels serve as so-called bearer (B) channels which carry voice traffic, and a single control or data (D) channel that carries the control messaging.

A number of problems in mobile system design are driven by the ever increasing need for mobile communication services, which typically requires system operators to serve an geometrically increasing number of users in a given service area. For example, even in the well established industrialized nations of the world, the number of mobile telephone users continues to increase at rates of 50% per year and more. As a result, certain types of high capacity base transceiver system (BTS) equipment making use of broadband radio technology have been developed which are intended to service a relatively large number of active mobile stations in each cell. Such broadband equipment can service, for example, ninety-six simultaneously active voice and control radio channels within a single four-foot tall rack of electronic equipment.

Unfortunately, the deployment of broadband radio equipment in and of itself does not solve all of the problems presented by increased user demand. As the number of active mobile stations in a given service area increases the demand on the BTS and MSC resources which are responsible for supporting mobility messaging also increases.

In addition, there are typically multiple handoff attempts from an originating or serving cell to a destination or neighboring cell as a mobile station moves about the service area. Such handoff attempts not only occur as a mobile station moves near the edge of the serving cell, but may also occur as the mobile station move behind buildings and other obstacles produce a "shadowing" or multipath effect in the propagation of radio signals in the serving cell.

While certain newer forms of mobile communication systems known as personal communications systems (PCS) provide for a greater number of users in a given geographic area by deploying a greater number of BTSs in physically smaller cells, the handoff messaging situation is only exacerbated by the prospect of having to handle a greater number of mobile stations located among a larger number of physically smaller cells. The end result is that the service provider is typically left with no choice but to incur the expense of deploying a greater number of MSCs in a given service area.

DESCRIPTION OF THE INVENTION

OBJECTS OF THE INVENTION

It is an object of this invention to provide mobility messaging architecture for a mobile communication system whereby a larger number of calls may be supported by a given MSC.

Another object is to provide for efficient mobility message routing in a mobile communication system to minimize the time delay in the handoff request and other mobility messaging processes.

SUMMARY OF THE INVENTION

Briefly, the invention is a technique for mobility signaling between a base transceiver system (BTS) and mobile switching center (MSC) in a wireless telecommunications system. The MSC is interconnected to a number of BTSs using one or more primary digital communication links such as an Integrated Services Digital Network (ISDN) link, with the link including a number of physical bearer (B) channels for voice transmission and at least one physical data (D) channel for control function transmission.

Standard call processing messages are utilized on the ISDN D channel to support basic telephone functions such as call origination, call termination, and call release as is possible.

An additional logical communications link is established over each ISDN D channel to accommodate mobility related messaging which may include messages such as hand-off, paging, broadcast, and registration messaging needed to support mobile communications. The logical communications links are implemented using an unbalanced communication mode such as provided by the unnumbered information (UI) feature of ISDN and utilizing a service access point indicator (SAPI) address different from that address used for the standard call processing functions. As a result, the separate virtual link used for the UI frames with mobility messaging does not need to use call reference values and may be routed over any available virtual communication link. Mobility messaging may thus be transmitted with minimal overhead and is not restricted to either the physical ISDN link which is handling the standard call processing for a call or even the ISDN link which handled previous mobility messages for the same call.

More particularly, in accordance with the invention, a successful message signaling sequence between the BTS and MSC proceeds as follows. The BTS presently handling the mobile call, known as the serving BTS, determines the need for handoff after performing conventional power signaling measurements on the radio signals received from the mobile station (MS). Upon determining that handoff may be necessary, the BTS sends a Handoff Request message to the MSC using the UI format over a separate virtual link using the D channel. The virtual link is supplied by ensuring that a Service Access Point Indicator (SAPI) field which is not used by the standard ISDN messaging.

Without acknowledging the Handoff Request message, the MSC then proceeds to access a list of neighbor BTSs for the serving BTS and sends a Handoff Measurement Request message to each such neighbor BTS indicating that the mobile station is requesting a handoff. The Handoff Measurement Request message is also sent as a UI frame over the virtual communication link.

Each neighboring BTS then tunes to the mobile station frequency and measures a mobile signal strength. The neighboring BTS then responds to the MSC with a Handoff Measurement Response message, again using an unnumbered information (UI) message over the virtual link.

Once all neighboring BTSs have responded or a timeout period has expired, the MSC sends a Setup message to the neighboring BTS which reported the strongest measured signal strength. The Setup message is sent as a standard ISDN D message using the logical link to the BTS, and includes an indicator in the form of an Information Element field, which serves to notify the target neighbor BTS to set up a new radio channel for handoff. The MSC then waits for an acknowledgment from the neighboring BTS to the Setup message, and if no response is received, the MSC terminates the handoff process.

In the case of a continuing successful handoff procedure, the neighboring BTS responds to the MSC with a Call Proceeding message as a standard ISDN message over the D channel before selecting and enabling a new radio channel. The neighboring BTS also connects audio circuits to the selected ISDN B channel and then responds to the MSC with a Handoff Setup Confirm message, to confirm that handoff setup is now complete. The Handoff Setup Confirm message is sent using a UI frame over a virtual link.

BRIEF DESCRIPTION OF THE DRAWINGS

For a more complete understanding of the invention and its novel advantages and features, reference should be made to the accompanying drawings in which:

FIG. 7 is a diagram illustrating the format of a Handoff Request message;

FIG. 8 is a diagram showing the format of a Handoff Measurement Request message;

FIG. 9 is a diagram showing the format of a Handoff Measurement Response message;

FIG. 10 illustrates the format of a Handoff Setup Confirm message;

FIG. 11 illustrates the format of a Handoff Directive message; and

FIG. 12 illustrates the format of a Handoff Complete message.

DETAILED DESCRIPTION OF A PREFERRED EMBODIMENT

Figure 1:
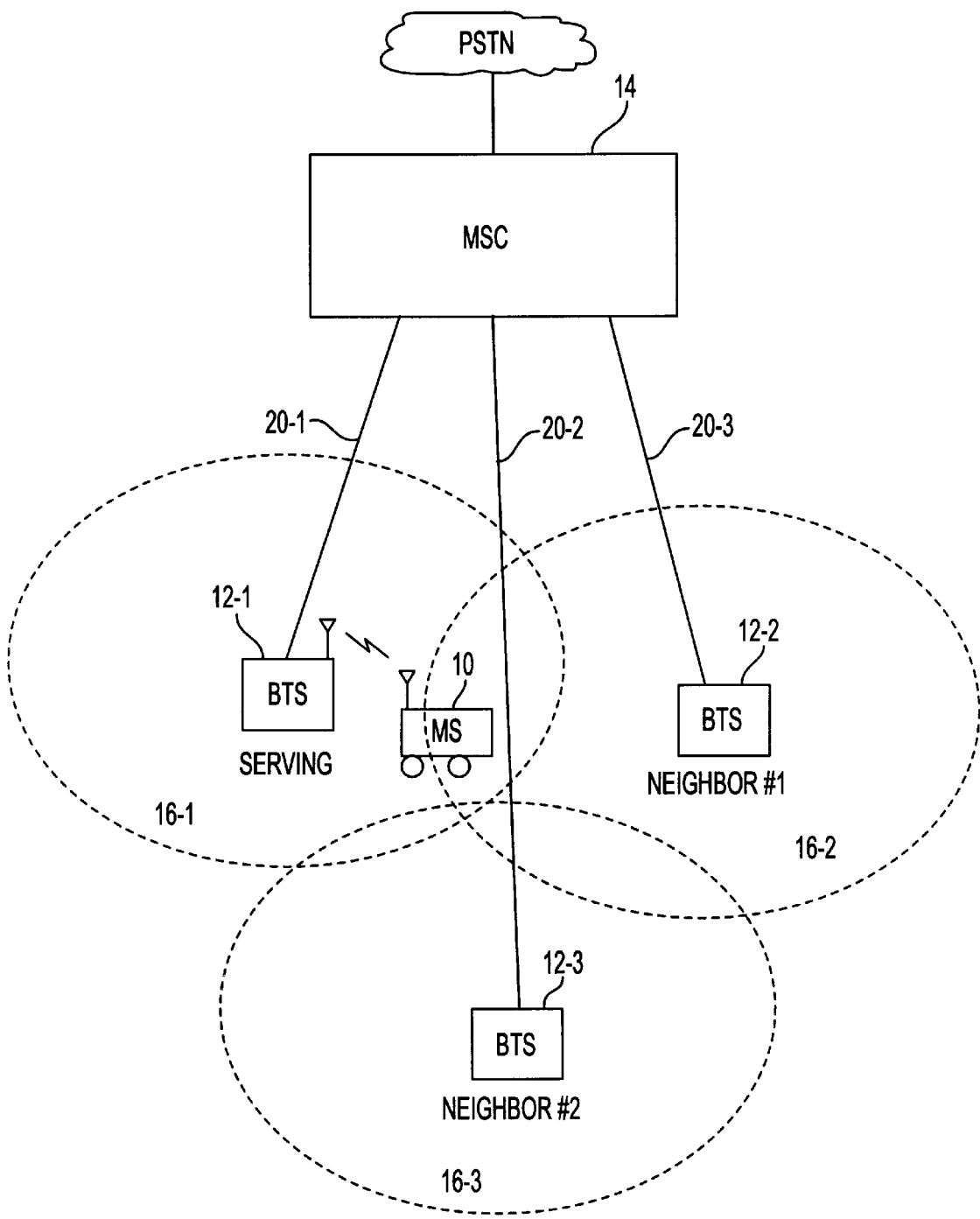
FIG. 1 is a block diagram showing the architecture of a mobile communication system making use of the invention.

FIG. 1 is a block diagram of the components of a wireless communication system such as a Cellular Mobile Telephone (CMT), Personal Communication System (PCS) or similar cellular system which includes mobile stations (MS) 10 (only one of which is shown), base transceiver systems (BTS) 12-1, 12-2, 12-3 (collectively, the base transceiver systems 12), and a mobile switching center (MSC) 14. The base transceiver systems 12 communicate with the mobile switching center 14 over transport links 20-1, 20-2, and 20-3, making use of the Integrated Services Digital Network (ISDN) protocol to which support multiple channel communication over a single physical connection.

A base transceiver system 12 is deployed to service the mobile stations 10 located in each cell 16-1, 16-2, 16-3. Cell 16-1 in which the mobile station 10 is presently located is referred to as the serving cell, adjacent cells 16-2 and 16-3 into which the mobile station 10 may travel are referred to as neighbor cells. As the mobile station 10 moves through the pattern of cells 16, the control of telephone calls—made from the user's perspective in much the same manner as on regular telephones—are switched from a BTS 12-1 in the serving cell 16-1 to one of the neighbor cells 12 under commands from the mobile switching center 14.

The mobile switching center 14 manages the connections to a public switched telephone network (PSTN) for a number of BTSs 12.

The BTSs 12 are responsible for generating appropriately modulated and encoded radio signals to remain in radio contact with the mobile stations 10 located within their respective cell 16. The radio signaling protocol, or "air interface" is use is not of particular importance to this invention and may be any number of standards promulgated by the Telecommunications Industry Association (TIA) in the United States and in Europe and elsewhere by the European Telecommunication Standards Institute (ETSI).

Each BTS 12 is also required to maintain a landline connection with the MSC 14 in order that the mobile stations might connect to landline telephones to the public switched telephone network (PSTN) 22.

As stated previously, the BTSs 12 are connected to the MSC 14 using ISDN links 20. The standard ISDN link provides 24 channels on a single physical carrier media, allocated for example as "23B+D", meaning that 23 of the channels serve as so-called bearer (B) channels which carry voice traffic, and a single control or data (D) channel that carries control messaging. The actual number of bearer channels required depends upon the maximum number of active radio channels expected in a BTS 12, and ISDN links supporting 20 a greater number of bearer channels for link 20 can also be used, such as "47B+D", "71B+D" and "95B+D".

The ISDN links 20 thus not only carry the voice signals between the BTS 12 and MSC 14, but also support control messaging. Control messaging, includes both the messaging which is needed as in any telephone system to originate and terminate telephone calls, more commonly known as call processing, as well as the control messaging needed to permit a call to remain in progress as the mobile station moves from a serving cell 12-1 to a neighbor cell 12-2, 12-3, known as mobility messaging, during which time the control of the call is "handed off" from one BTS to another.

ISDN provides a convenient messaging scheme already built in to perform standard call processing tasks such as call origination, call termination and call release features. The standard ISDN signaling scheme is thus used as much as possible to perform the control messaging which corresponds to the conventional call processing tasks, using numbered information frames in a balanced communication mode.

However, in accordance with the invention, in order to accommodate mobility related control messaging with minimal overhead, mobility messages are sent using unnumbered information (UI) frames over one or more virtual links which may be established over each physical ISDN D channel.

Mobility related messages include those message relating to mobile communication system features such as hand-off, paging, broadcast, and registration. A specific example of how handoff related messaging is accomplished is discussed below.

The virtual communications links are implemented using the unnumbered information (UI) feature of ISDN and utilizing a non-standard Service Access Point Indicator (SAPI) address different from that address used for the call processing functions.

Because the separate virtual link using UI frames does not use call reference values the mobility messages may be routed over any available link and is not restricted to either the physical ISDN D link which is handling the standard call processing for the call or even the virtual ISDN link which handled previous mobility messages for the same call.

Figure 2:
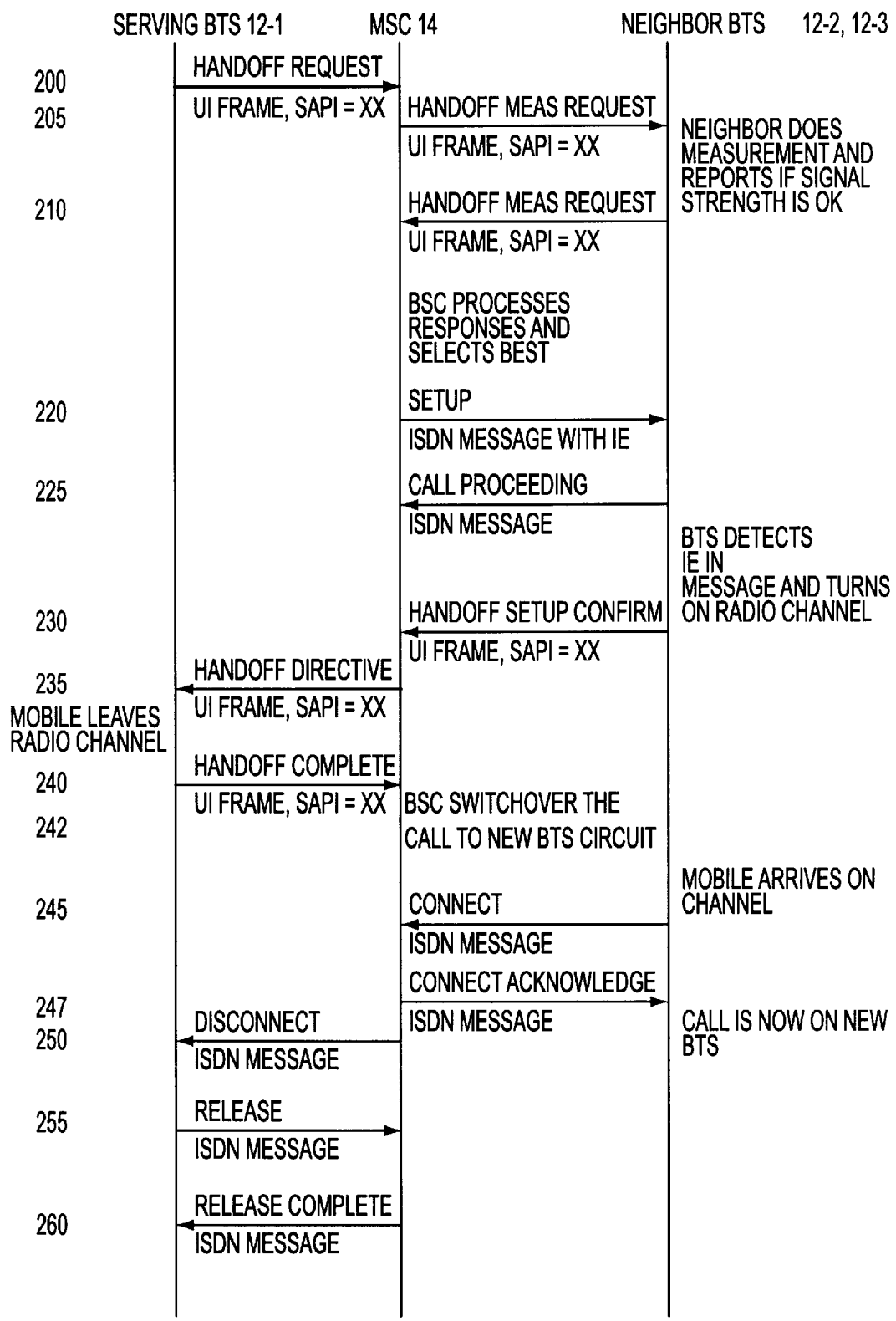
FIG. 2 is a signaling sequence diagram illustrating the message used by the mobile communication system of FIG. 1 when a hand-off is successful.

Referring now to FIG. 2, a message signaling sequence between the BTS and MSC for a successful handoff proceeds as follows. In a first step 200, the BTS 12 presently handling the mobile call, known as the serving BTS 12-1, determines the need for handoff after performing conventional power signaling measurements on the radio signals received from the mobile station (MS) 10. Upon determining that handoff may be necessary, the serving BTS 12-1 sends a Handoff Request message to the MSC 14.

The Handoff Request message is sent using the unnumbered information (UI) ISDN frame format over a separate virtual link established via the D channel on the ISDN link 20-1 connecting BTS 12-1 with the MSC 14. The virtual link is supplied by ensuring that a Service Access Point Indicator (SAPI) field is used which is not used by the standard ISDN messaging, indicated by the notation "SAPI=xx" in the drawing figures.

Figure 6:
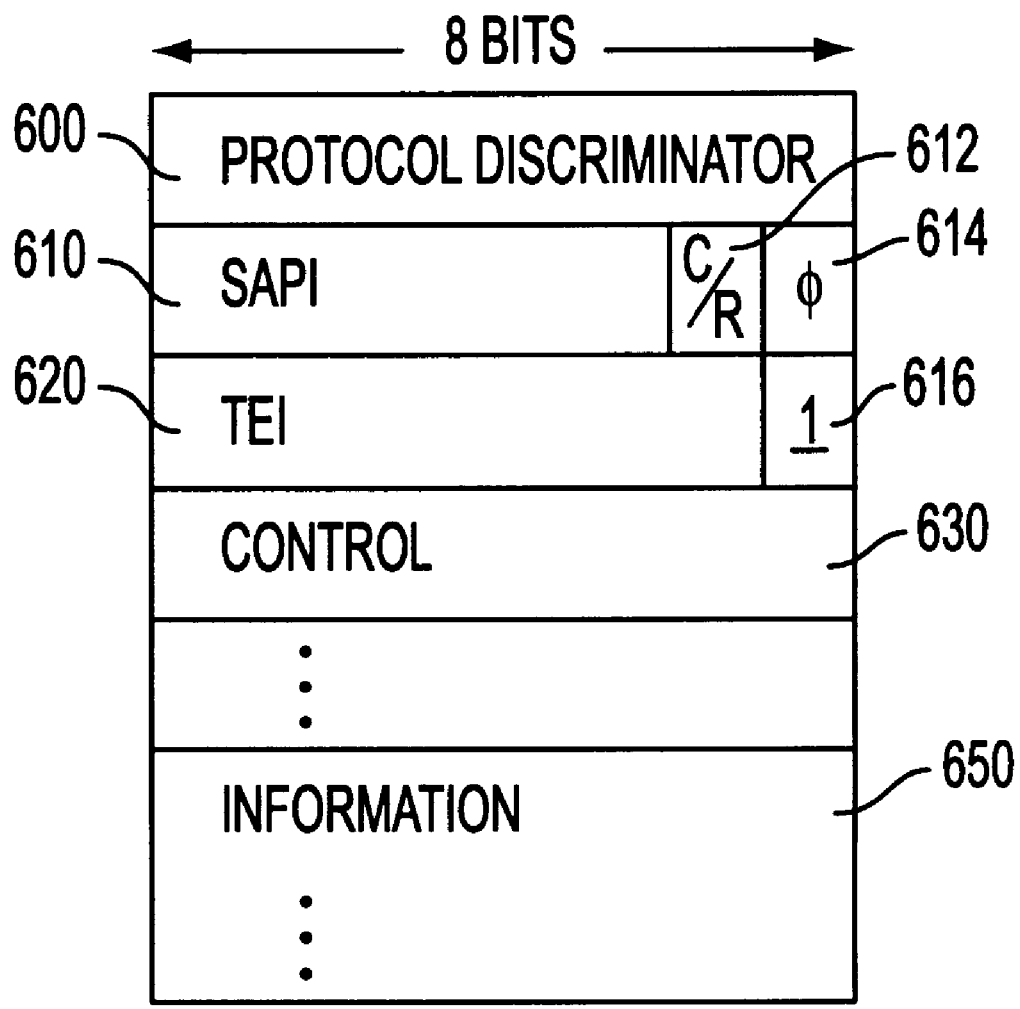
FIG. 6 is a diagram illustrating the format of an ISDN message.

The particular unnumbered information (UI) ISDN message is preferably in the format shown in FIG. 6. It consists of a fixed protocol discriminator field byte 600, the SAPI field 610 consisting of the six most significant bits of the second byte, a C/R bit indicating whether the message is a command or response, and a least significant fixed zero bit, a third byte consisting of a Terminal Endpoint Identifier (TEI) field 620 used as a secondary addressing field as needed, a control byte 630 indicating a message type as being supervisory, numbered, or unnumbered, in this case set to value indicating that this is an unnumbered information (UI) frame, and then one or more bytes indicating the information field 650 in the message.

The Handoff Request message mentioned in step 200 of FIG. 2 step thus takes the form shown in FIG. 6, with a particular information field 650 in a format as shown in FIG. 7. The Handoff Request message includes fields needed for specifying the Handoff Request message type (0×01), Serving BTS identifier, ISDN link identifier, channel index number, and measured power level of the channel requesting handoff.

Returning now to FIG. 2, without waiting for any acknowledgment of the Handoff Request message, the MSC 14 then proceeds to access an internal list of neighbor BTSs for the serving BTS 12-1. In step 205, the MSC 14 sends a Handoff Measurement Request message to each such neighbor BTS 12-2, 12-3 indicating that the mobile station 10 is requesting a handoff.

The Handoff Measurement Request message is also sent as a UI frame over the virtual communication link, in the format shown in FIG. 8. It includes fields indicating the Handoff Measurement Request message type (0×02), a measurement request identification, requesting channel number, power level, and serving BTS 12-1 measured signal strength.

In step 210 of FIG. 2, each neighboring BTS 12-2, 12-3 in turn tunes to the frequency indicated by the requesting channel number, and measures a mobile signal strength in its respective cell 16-2, 16-3. The neighboring BTSs 16-2, 16-3 then each respond to the MSC 14 with a Handoff Measurement Response message. The Handoff Measurement Response message again uses an unnumbered information (UI) message, in a form as shown in FIG. 9, including a message type field (0×03), a measurement request identification field, and the current BTS measured signal strength as measured by the neighboring BTS.

Returning to FIG. 2, once all neighboring BTSs 12-2, 12-3 have responded as in step 210, or a timeout period has expired, the MSC 14 then determines in a well known fashion in accordance with the radio protocol in use, whether the measured signal strengths indicate that a handoff can be completed. The Handoff Request, Handoff Measurement Request, and Handoff Measurement Response messages are typically repeated a number of times during a call before a handoff is actually attempted by the MSC 14. Because of the minimized overhead in routing these three messages as UI frames, the time required for the MSC 14 to make the handoff determination is minimized, and perhaps more importantly, the number of data bytes which must be sent over the ISDN links 20 is minimized. As a result, the MSC 14 can service a larger number of BTS's 12.

Continuing with the discussion of FIG. 2, after determining that a handoff is necessary, in step 220 the MSC 14 sends a Setup message to the neighboring BTS, such as BTS 12-2, which reported the strongest measured signal strength. The Setup message is sent to the target neighboring BTS 12-2 as a standard ISDN D Setup message, and includes an indicator in the form of an Information Element data field which serves to notify the neighboring BTS 12-2 to prepare for the handoff by setting up a new radio channel.

In step 225 the MSC 14 then waits for a Call Proceeding message to confirm that the neighboring BTS has assumed responsibility as the target BTS 12-2.

In step 230, the target BTS 12-2 selects and enables a new radio channel, leaving the new radio channel muted for the time being. The new radio channel is also connected it to an available B channel in its associated ISDN link 20-2 and responds to the MSC 14 with a Handoff Setup Confirm message containing the necessary information concerning the target BTS 12-1. The Handoff Setup Confirm message may be sent as a UI frame in the format shown in FIG. 10, with a UI frame type field '0x04' indicating the new channel number, frequency, and power level for the target BTS 12-1.

In step 235 of FIG. 2, a Handoff Directive command is then sent by the MSC 14 to the serving BTS 12-1 to inform the serving BTS 12-1 of the need to switch the mobile station 10 over to the new channel frequency. Handoff Directive is preferably in the form of FIG. 11, UI frame type '0x05', indicating the new radio channel in the target BTS 12-2. In response to this, the serving BTS 12-1 then transmits commands to the mobile station to change radio channels.

Once this is accomplished, the serving BTS mutes the old radio channel and returns a Handoff Complete message to the MSC 14 in step 240. The format of the Handoff Complete message, shown in FIG. 12, is a UI frame type '0x06', indicating that the mobile station has successfully switched radio channels.

The MSC 14 then proceeds to switch over the landline call path to the other party in the call from a B channel in the ISDN link 20-1 connected to the serving BTS 12-1 to a B channel in the ISDN link 20-2 serving the target BTS 12-2, in step 242.

Now that control over the mobile station 10 radio signaling has arrived on the target BTS 12-2, the remaining steps are used to complete the new call connection between the target BTS 12-2 and MSC 14, and to release the call connection between the BTS 12-1 and MSC 14, using standard ISDN signaling messages such as Connect, Connect Acknowledge, Disconnect, Release, and Release Complete, as shown in step 245, step 247, step 250, step 255, and step 260.

Figure 3:
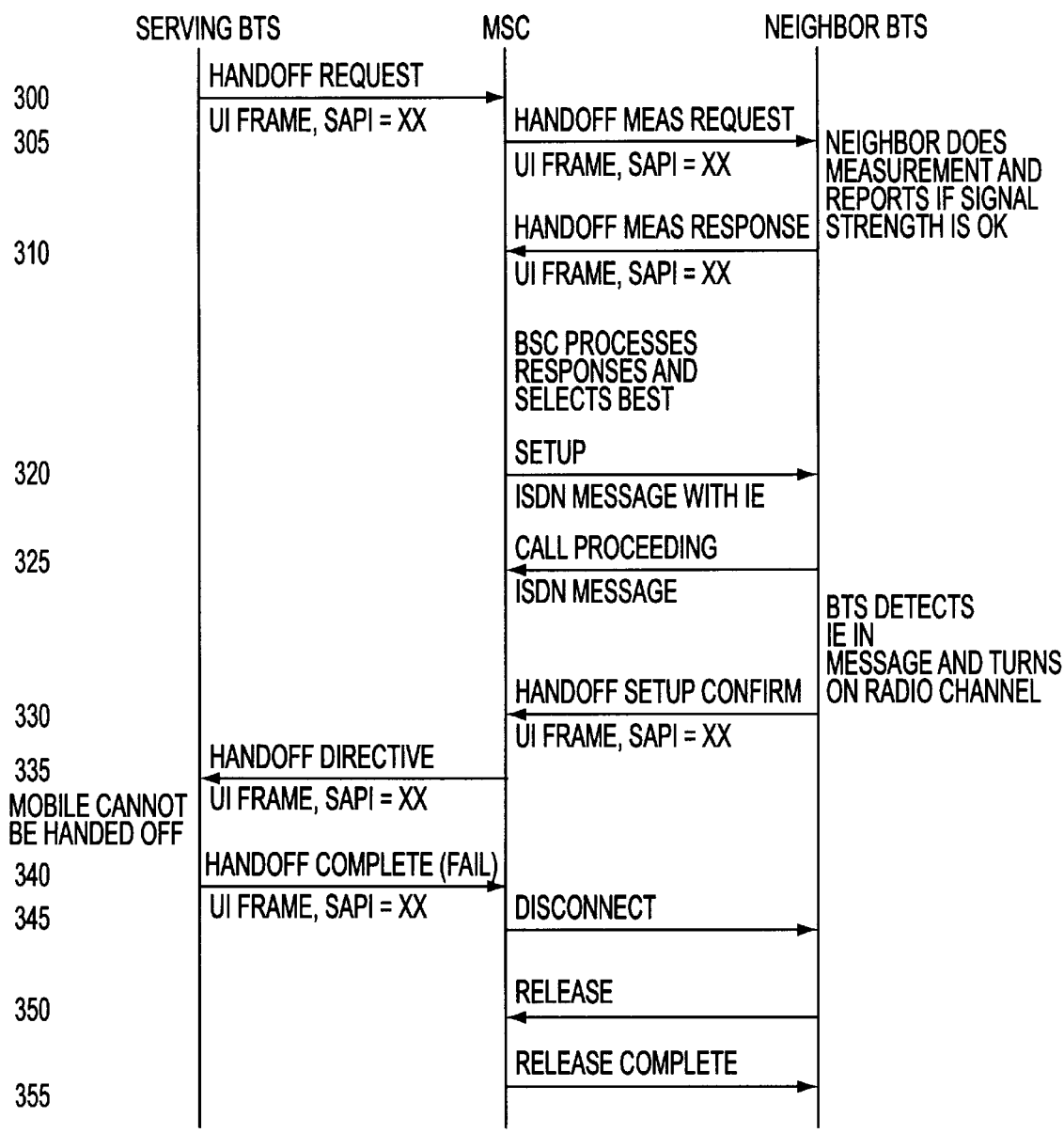
FIG. 3 is a signaling sequence diagram for when a hand-off is aborted by the servicing base transceiver system (BTS)

FIG. 3 is a signaling sequence diagram for when a hand-off is aborted by the serving BTS 12-1. The sequence proceeds through the first seven steps occurring as in a successful handoff already described in connection with FIG. 2, with a Handoff Request in step 300, Handoff Measurement Request in step 305, Handoff Measurement Response in step 310, Setup in step 320, Call Proceeding in Step 325, Handoff Setup Confirm in step 330, and Handoff Directive in step 335.

However in this instance in response to the Handoff Directive in step 335, the serving BTS 12-1 causes the handoff to be aborted by transmitting a Handoff Complete message in step 340 with a failure indication. The failure indication could be caused by the mobile station 10 transmitting signal tone (ST) or if the mobile signal has been lost in the interim. In this instance the Handoff Complete message is set to indicate the failure (FIG. 12).

Figure 4:
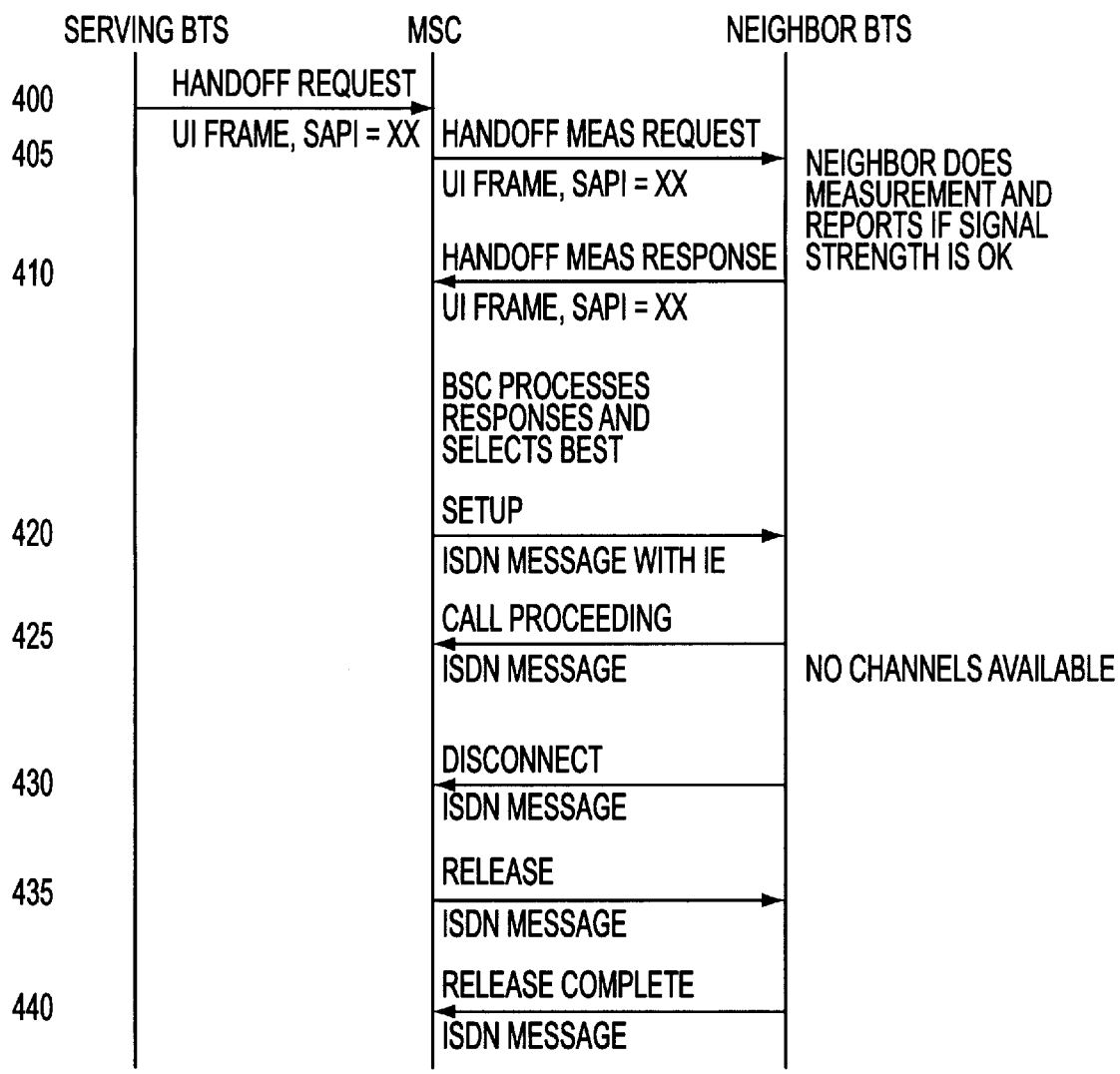
FIG. 4 is a signaling diagram for when the target neighboring BTS has no radio channels available.

FIG. 4 is a signaling diagram for when the target BTS 12-2 has no new radio channels available. In this instance the first five messages occur as in the successful handoff case, including Handoff Request in step 400, Handoff Measurement Request in step 405, Handoff Measurement Response in step 410, Setup in step 420, and Call Proceeding in Step 425. However, in this case the fact that no radio channel is available in the target BTS is indicated by sending a Disconnect ISDN message in step 430 to the MSC 14, receiving a Release ISDN message from the MSC 14 in step 435, and transmitting a Release Complete ISDN message to the MSC 14 in step 440, ending the sequence.

Figure 5:
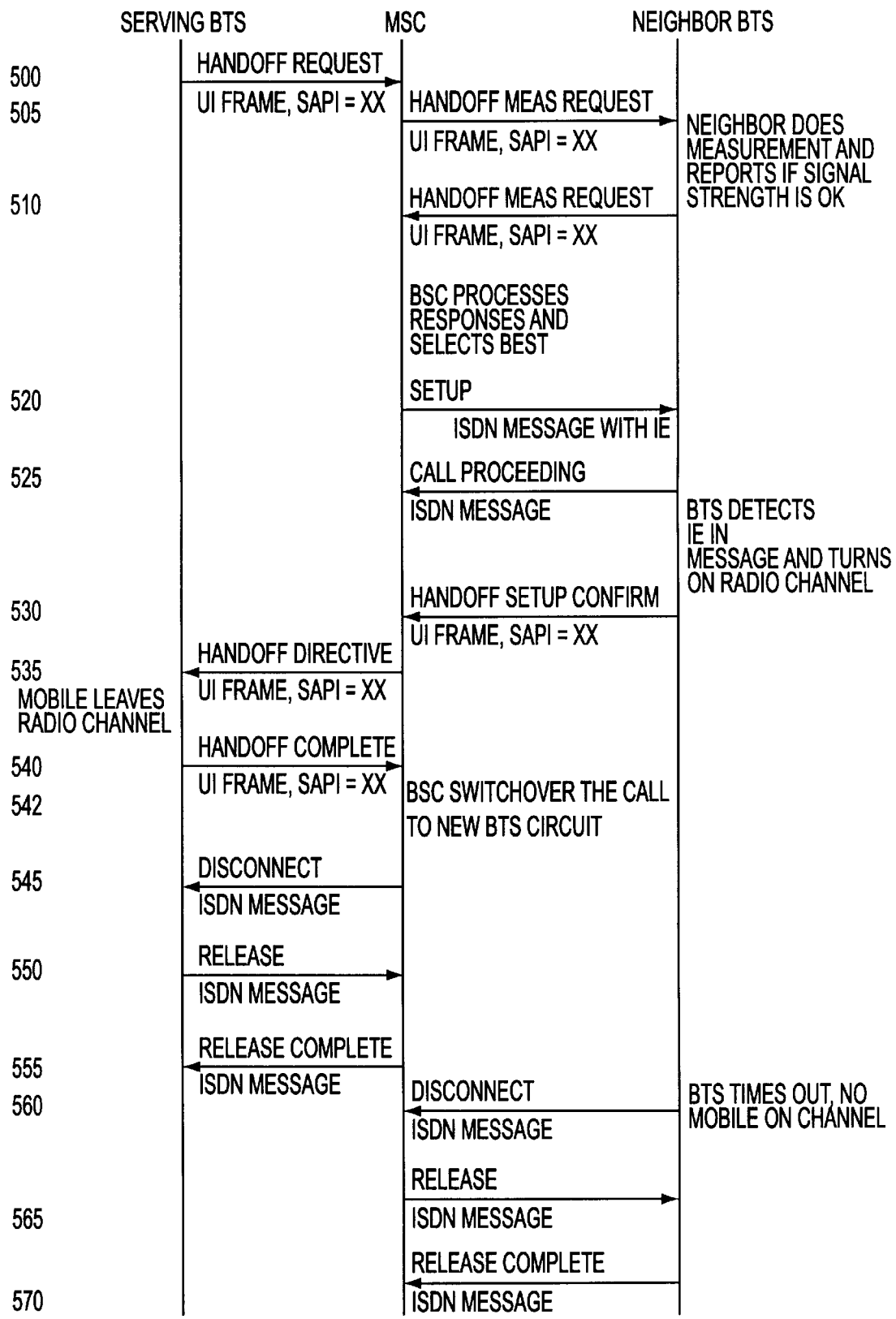
FIG. 5 is a signaling diagram for when the mobile station fails to arrive on the new radio channel in the neighboring BTS.

Finally, FIG. 5 is a signaling diagram for when the mobile station 10 fails to be successfully on the new radio channel in the target BTS 12-2. The first ten steps in the handoff sequence occur as in the case of FIG. 2, with a Handoff Request in step 500, Handoff Measurement Request in step 505, Handoff Measurement Response in step 510, Setup in step 520, Call Proceeding in Step 525, Handoff Setup Confirm in step 530, Handoff Directive in step 535, and Handoff Complete in step 540.

However, in this instance the mobile station 10 fails to arrive on the new channel in step 542, and in step 545, step 550, step 555, step 540, and step 570, the MSC 14 sends messages to the serving BTS 12-1 to terminate the call. The target BTS 12-2 times out waiting for the mobile and completes the disconnect sequence.

What is claimed is:

1. A mobile communications system in which a plurality of base transceiver systems are connected to a mobile switching center using one or more digital communication links making use of an integrated digital services protocol, with the communication links each including a plurality of bearer, B, channels for voice transmission and at least one data, D, channel for control function transmission, comprising:

means for routing call processing messages over the D channel in the communication links as numbered information frame messages; and means for routing mobility messages over the D channel in the communication links as unnumbered information frame messages, wherein said mobility messages are routed over the D channel separately from said call processing messages.

2. A mobile communications system as in claim 1 wherein the call processing messages include call origination, call termination, and call release messages.

3. A mobile communications system as in claim 1 wherein the mobility messages include handoff messages.

4. A mobile communications system as in claim 1 wherein the mobility messages utilize a Service Access Point Indicator, SAPI, address different from a SAPI address used for the call processing messages.

5. A mobile communication system as in claim 1 wherein the means for routing mobility messages routes the mobility messages over a plurality of logical channels implemented on a given D channel in a given communications link.

6. A mobile communications system as in claim 5 in which at least two successive mobility messages for a given telephone call are sent over a different logical channel.

7. A process for implementing handoff of a mobile telephone call in a mobile communication system, the mobile communication system including a mobile switching center, MSC, and a plurality of base transceiver systems, BTSs, each BTS responsible for radio communication with mobile stations located in a respective cell of the mobile communication system, the BTSs and MSC being connected to one another by a primary digital interface making use of an integrated digital services protocol which support numbered information frames and unnumbered information frames, the mobile telephone call initially in progress between a mobile station and one of the BTSs referred to as the serving BTS, and the BTSs located in cells neighboring the serving BTS referred to as the neighbor BTSs, the handoff process comprising the steps of:

in the serving BTS, indicating the need for handoff after performing conventional power signaling measurements on the radio signals received from the mobile station, by sending a Handoff Request message to the MSC in the form of an unnumbered information message;

in the MSC, sending a Handoff Measurement Request message to each neighbor BTS in the form of an unnumbered information message indicating that the mobile station operating on an indicated radio channel is requesting a handoff; and in each neighbor BTS, tuning to the indicated radio channel and measuring a mobile signal strength, and then sending Handoff Measurement Response message to the MSC, using an unnumbered information message, which indicates the measured mobile signal strength in the respective neighbor BTS.

8. A process as in claim 7 additionally comprising the step of:

in the MSC, sending a Setup message to the neighboring BTS which reported the strongest measured signal strength, the Setup message being sent in the form of a numbered information message.

9. A process as in claim 8 additionally comprising the step of:

in the MSC, waiting for an acknowledgment from the neighboring BTS which received the Setup message, and if no response is received, terminating the process.

10. A process as in claim 8 additionally comprising the step of:

in the neighboring BTS, sending a Handoff Setup Confirm message to the MSC as an unnumbered information message once a new radio channel is established in the neighboring BTS.

11. A process as in claim 10 additionally comprising the step of:

in the MSC, sending a Handoff Directive command to the serving BTS in the form of an unnumbered information message.

12. A process as in claim 11 additionally comprising the step of:

in the serving BTS, sending a Handoff Complete command to the MSC in the form of an unnumbered information message.

13. A process as in claim 7 in which the unnumbered information frames include a service access point indicator (SAPI) field which is not used by the numbered frames.

14. A mobile communication system for implementing handoff of a mobile telephone call in said mobile communication system, the mobile communication system operating in an area divided into a plurality of cells, said mobile communication system comprising:

mobile switching center, MSC, means, a plurality of base transceiver system, BTS, means, each BTS means responsible for radio communication with mobile stations located in a respective cell of the mobile communication system, the plurality of BTS means and the MSC means being connected to one another by a primary digital interface making use of an integrated digital services protocol which support numbered information frames and unnumbered information frames, the mobile telephone call initially in progress between a mobile station and one of the BTS means referred to as the serving BTS means, and each of the BTS means located in cells neighboring the serving BTS means referred to as the neighbor BTS means, said mobile communications system comprising:

serving BTS means further comprising means for indicating the need for handoff after performing conventional power signaling measurements on the radio signals received from the mobile station, by sending a Handoff Request message to the MSC means in the form of an unnumbered information message;

MSC means further comprising means for sending a Handoff Measurement Request message to each neighbor BTS means in the form of an unnumbered information message indicating that the mobile station operating on an indicated radio channel is requesting a handoff; and neighbor BTS means further comprising means for tuning to the indicated radio channel and measuring a mobile signal strength, and then sending Handoff Measurement Response message to the MSC means, using an unnumbered information message, which indicates the measured mobile signal strength in the respective neighbor BTS means.

* * * * *

UNITED STATES PATENT AND TRADEMARK OFFICE
CERTIFICATE OF CORRECTION

PATENT NO : 5,956,645
DATED : September 21, 1999
INVENTOR(S): HARPER, Donald; YANG, Sheausong It is certified that error appears in the above-identified patent and that said Letters Patent is hereby corrected as shown below:

Cover Page, Item [73]   Correct the word "Communicatoins", to
 --Communications--.

Signed and Sealed this

Twenty-sixth Day of September, 2000

*Attest:*

Q. TODD DICKINSON

*Attesting Officer*   *Director of Patents and Trademarks*